(12) United States Patent
Hirano et al.

(10) Patent No.: US 9,192,994 B2
(45) Date of Patent: Nov. 24, 2015

(54) METHOD FOR PRODUCING SUBSTRATE HAVING DISPERSED PARTICLES OF DENDRIMER COMPOUND ON THE SURFACE THEREOF, AND SUBSTRATE HAVING DISPERSED PARTICLES OF DENDRIMER COMPOUND ON THE SURFACE THEREOF

(75) Inventors: Isao Hirano, Kawasak (JP); Kimihisa Yamamoto, Tokyo (JP); Takane Imaoka, Tokyo (JP)

(73) Assignees: TOKYO OHKA KOGYO CO., LTD., Kawasaki-Shi (JP); TOKYO INSTITUTE OF TECHNOLOGY, Tokyo (JP)

( * ) Notice: Subject to any disclaimer, the term of this patent is extended or adjusted under 35 U.S.C. 154(b) by 494 days.

(21) Appl. No.: 13/567,926

(22) Filed: Aug. 6, 2012

(65) Prior Publication Data

US 2013/0040107 A1 Feb. 14, 2013

(30) Foreign Application Priority Data

Aug. 8, 2011 (JP) .................................. 2011-172578

(51) Int. Cl.
| | |
|---|---|
| *B05D 1/02* | (2006.01) |
| *B23B 3/14* | (2006.01) |
| *C08G 83/00* | (2006.01) |
| *B32B 3/00* | (2006.01) |
| *B82Y 30/00* | (2011.01) |
| *C09D 201/00* | (2006.01) |

(52) U.S. Cl.
CPC ... *B23B 3/14* (2013.01); *B05D 1/02* (2013.01); *B32B 3/00* (2013.01); *B82Y 30/00* (2013.01); *C08G 83/002* (2013.01); *C08G 83/003* (2013.01); *C09D 201/005* (2013.01); *Y10T 428/24372* (2015.01)

(58) Field of Classification Search
None
See application file for complete search history.

(56) References Cited

U.S. PATENT DOCUMENTS

| | | | |
|---|---|---|---|
| 2003/0174638 A1* | 9/2003 | Maekawa et al. | 369/275.1 |
| 2012/0308470 A1* | 12/2012 | Ono et al. | 423/447.1 |
| 2014/0242388 A1* | 8/2014 | Hirano et al. | 428/403 |

FOREIGN PATENT DOCUMENTS

| | | |
|---|---|---|
| JP | 2001-508484 | 6/2001 |
| JP | 2002-058992 A | 2/2002 |
| JP | 2004-331850 A | 11/2004 |
| JP | 2008-100987 | 5/2008 |

OTHER PUBLICATIONS

Ochi et al, Chemistry A European Journal, 17, pp. 800-809, 2011.*
Satoh et al, J. Am. Chem. Soc., 127, pp. 13030-13038, 2005.*
Higuchi et al.; "First Synthesis of Phenylazomethine Dendrimer Ligands and Structural Studies," Journal of American Chemical Society, vol. 123, pp. 4414-4420, 2001.
Yamamoto et al., "Size-Specific Catalytic Activity of Platinum Clusters Enhances Oxygen Reduction Reactions," Nature Chemistry, vol. 1, pp. 397-402, Aug. 2009.
Satoh et al., "Quantum Size Effect in $TiO_2$ Nanoparticles Prepared by Finely Controlled Metal Assembly on Dendrimer Templates," Nature Nanotechnology, vol. 3, pp. 106-111, Feb. 2008.
Nakamula et al., "A Uniform Bimetallic Rhodium/Iron Nanoparticle Catalyst for the Hydrogenation of Olefins and Nitroarenes," Agnew Chem. Int. Ed., vol. 50, pp. 5830-5833, 2011.
Liu et al., "Self-Assembly of Polyphenylene Dendrimers Into Micrometer Long Nanofibers: An Atomic Force Microscopy Study," Langmuir, vol. 18, pp. 2385-2391, 2002.
Sano et al, "A Simple Method to Produce Dendrimer Nanodots Over Centimeter Scales by Rapid Evaporation of Solvents," Langmuir, vol. 17, pp. 1807-1810, 2001.

* cited by examiner

*Primary Examiner* — Erma Cameron
(74) *Attorney, Agent, or Firm* — Knobbe Martens Olson & Bear LLP

(57) ABSTRACT

A method for producing a substrate having dispersed particles of a dendrimer compound on the surface thereof, the method including: an application step including dissolving a phenyl azomethine dendrimer compound in a solvent to prepare a solution, and applying the solution on the surface of a substrate; and a volatilization step including volatilizing the solvent from the solution applied on the surface of the substrate, the phenyl azomethine dendrimer compound included in the solution having a concentration of no greater than 5 µmol/L is employed.

4 Claims, No Drawings

METHOD FOR PRODUCING SUBSTRATE HAVING DISPERSED PARTICLES OF DENDRIMER COMPOUND ON THE SURFACE THEREOF, AND SUBSTRATE HAVING DISPERSED PARTICLES OF DENDRIMER COMPOUND ON THE SURFACE THEREOF

This application is based on and claims the benefit of priority from Japanese Patent Application No. 2011-172578, filed on 8 Aug. 2011, the content of which is incorporated herein by reference.

BACKGROUND OF THE INVENTION

1. Field of the Invention

The present invention relates to a method for producing a substrate having dispersed particles of a dendrimer compound on the surface thereof, and a substrate having dispersed particles of a dendrimer compound on the surface thereof.

2. Related Art

In recent years, metal nanoparticles have attracted attention as basic materials for use in medical drugs, electronically functional materials, environmentally compatible materials and the like. Nanoparticles are fine particles having a diameter of typically no greater than 10 nm, and they are not only useful per se as medical drugs, electronic function materials, environmentally compatible materials and the like, but also superior in activities as a catalyst for synthesizing the same. Such characteristic features result from a quantum effect due to the nanoparticles being fine particles having a diameter of no greater than 10 nm, and a greater active surface area accompanied by being fine particles. However, micronization of a metal is difficult, in general, since an agglutinative action among the particles increases along with the extent of micronization.

Under such circumstances, as methods for producing nanoparticles, methods in which a dendrimer compound is used as a template have been proposed (see, for example, Patent Document 1). Dendrimer compounds that include in the backbone a nitrogen atom, etc., having an unpaired electron pair are capable of forming a complex with a Lewis acid, and can incorporate a variety of molecules and atoms within their molecules.

Patent Document 2 has proposed production of metal nanoparticles utilizing such characteristic features of a dendrimer compound, and the production includes forming a complex by allowing all imine moieties of a phenyl azomethine dendrimer compound to be coordinated with a metal compound such as rhodium first, and thereafter reducing the metal compound included in the complex in a solution. According to this method, metal nanoparticles are stabilized within the phenyl azomethine dendrimer; therefore, a decrease in activity such as a catalytic action accompanied by aggregation of metal nanoparticles can be prevented.

Patent Document 1: Japanese Unexamined Patent Application (Translation of PCT Publication), Publication No. 2001-508484

Patent Document 2: Japanese Unexamined Patent Application, Publication No. 2008-100987

Non-Patent Document 1: M. Higuchi, S. Shiki, K. Ariga, K. Yamamoto, J. Am. Chem. Soc., 2001, 123, 4414-4420

Non-Patent Document 2: K. Yamamoto, T. Imaoka, W.-J. Chun, O. Enoki, H. Katoh, M. Takenaga, A. Sonoi, Nature Chem., 2009, 1, 397-402

Non-Patent Document 3: N. Satoh, T. Nakashima, K. Kamikura, K. Yamamoto, Nature Nanotech, 2008, 3, 106-111

Non-Patent Document 4: I. Nakamula, Y. Yamanoi, T. Imaoka, K. Yamamoto, H. Nishihara, Angew. Chem., Int. Ed., 2011, 50, 5830-5833

Non-Patent Document 5: D. Liu, H. Zhang, P. C. M. Grim, S. DeFeyter, U.-M. Wiesler, A. J. Berresheim, K. Mullen, and F. C. DeSchryver, Langmuir, 2002, 18, 2385-2391

Non-Patent Document 6: M. Sano, J. Okamura, A. Ikeda, and S. Shinkai, Langmuir. 2001, 17, 1807-1810

SUMMARY OF THE INVENTION

The dendrimer compound that internally includes metal nanoparticles therein produced according to the procedure disclosed in Patent Document 2 is, for example, applied in the form of a solution of the compound on the surface of a desired substrate, whereby particles of the dendrimer compound are formed on the surface of the substrate (see Nonpatent Documents 5 and 6, as one example of the application of a dendrimer compound on a substrate). Accordingly, a catalytic action by way of the metal nanoparticles internally included in the dendrimer compound is imparted to the surface of the substrate. In such a process, for maximally achieving the characteristic features of the metal nanoparticles, each one molecule of the dendrimer compound that internally includes metal nanoparticles is ideally disposed discretely on the surface of the substrate. However, in fact, this compound is disposed in the form of massive aggregates consisting of a plurality of molecules. In such a case, the situation is equivalent to those in which metal nanoparticles are present on the surface of the substrate in an almost aggregated state, and thus characteristic features as metal nanoparticles will be significantly diminished. However, under current circumstances, a method in which a dendrimer compound is disposed on the surface of the substrate in a highly dispersed state has not been proposed so far.

The present invention was made in view of the foregoing circumstances, and an object of the present invention is to provide a means for disposing particles of a dendrimer compound in a highly dispersed state on the surface of a substrate, and a substrate which was produced by the means and has particles of a dendrimer compound disposed in a highly dispersed state on the surface thereof.

The present inventors have intensively studied in order to solve the foregoing problems and consequently found that when a phenyl azomethine dendrimer compound is used as a dendrimer compound, and a solution of this phenyl azomethine dendrimer compound is applied on the surface of a substrate to allow its particles to be deposited on the surface of the substrate, the aforementioned problems can be solved by setting the concentration of the phenyl azomethine dendrimer compound in the solution to be no greater than 5 µmol/L, thereby completing the present invention.

A first aspect of the present invention provides a method for producing a substrate having dispersed particles of a dendrimer compound on the surface thereof, the method including: an application step including dissolving a phenyl azomethine dendrimer compound represented by the following general formula (1) in a solvent to prepare a solution, and applying the solution on the surface of a substrate; and a volatilization step including volatilizing the solvent from the solution applied on the surface of the substrate, the concentration of the phenyl azomethine dendrimer compound contained in the solution is no greater than 5 µmol/L:

$$AB_nR_m \quad (1)$$

wherein A in the above general formula (1) is a core molecular group of the phenyl azomethine dendrimer and represented by a structure of the following formula:

$$R^1(\!-\!N\!=\!)_p$$

wherein $R^1$ represents an aromatic group that may have a substituent, and p represents the number of bonds to the $R^1$; and B in the above general formula (1) is represented by a structure of the following formula:

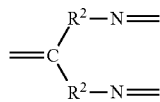

in which one azomethine bond is formed for the A, the R2 represents an aromatic group that may have the same or different substituent;

the R in the above general formula (1) is represented by a structure of the following formula:

in which an azomethine bond is formed to the B as a terminal group, and the $R^3$ represents an aromatic group that may have the same or different substituent;

n represents a generation number through a structure of the B of the phenyl azomethine dendrimer; and m represents the number of terminal groups R of the phenyl azomethine dendrimer, m=p when n=0, and m=2"p when n≥1.

In addition, a second aspect of the present invention provides a substrate having dispersed particles of a dendrimer compound on the surface thereof, which is a substrate having dispersed particles of a phenyl azomethine dendrimer compound represented by the following general formula (1) on the surface thereof, the dispersed particles having an average particle diameter in planar view of less than 60 nm as determined by observation with an AFM (atomic force microscope), and the dispersed particles having an average height from the surface of the substrate of less than 5 nm:

$$AB_nR_m \quad (1)$$

wherein A in the above general formula (1) is a core molecular group of the phenyl azomethine dendrimer and represented by a structure of the following formula:

$$R^1(\!-\!N\!=\!)_p$$

wherein $R^1$ represents an aromatic group that may have a substituent, and p represents the number of bonds to the $R^1$; and B in the above general formula (1) is represented by a structure of the following formula:

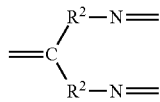

in which one azomethine bond is formed for the A, R2 represents an aromatic group that may have the same or different substituent;

R in the above general formula (1) is represented by a structure of the following formula:

in which an azomethine bond is formed to the B as a terminal group, and $R^3$ represents an aromatic group that may have the same or different substituent;

n represents a generation number through a structure of the B of the phenyl azomethine dendrimer; and m represents the number of terminal groups R of the phenyl azomethine dendrimer, m=p when n=0, and m=2"p when n≥1.

According to the present invention, provided are a means for disposing particles of a dendrimer compound in a highly dispersed state on the surface of a substrate, and a substrate which was produced by the means and has particles of a dendrimer compound disposed in a highly dispersed state on the surface thereof.

DETAILED DESCRIPTION OF THE INVENTION

<Method for Producing a Substrate Having Dispersed Particles of a Dendrimer Compound on the Surface Thereof>

In the following, one embodiment of the method for producing a substrate having dispersed particles of a dendrimer compound on the surface thereof of the present invention (hereinafter, may be appropriately abbreviated as "production method of the present invention") will be described. The production method of the present invention includes an application step including applying a solution of a phenyl azomethine dendrimer compound on the surface of a substrate, and a volatilization step including volatilizing the solvent from the solution applied on the surface of the substrate. By carrying out these steps, highly dispersed particles of the phenyl azomethine dendrimer compound can be disposed on the surface of a substrate. The term "highly dispersed" as referred to herein means that particles formed from a solution of a phenyl azomethine dendrimer compound are constituted with one to about a few dozen phenyl azomethine dendrimer molecules. Hereinafter, these steps will be described.

[Application Step]

In the application step, a phenyl azomethine dendrimer compound represented by the following formula (1) is dissolved in a solvent to prepare a solution, and the solution is applied on the surface of the substrate.

$$AB_nR_m \quad (1)$$

A in the above general formula (1) is a core molecular group of the phenyl azomethine dendrimer compound, and the phenyl azomethine dendrimer molecule grows a linkage of unit represented by B in general formula (1) to the outer side from the core molecular group as a center. As a result, the phenyl azomethine dendrimer molecule after growth has a structure in which the B is linked and radially grown from the A as a center. The number that B and R (to be described later) are linked refers to the "generation", the generation adjacent to the core molecular group A is a first generation, and the generation number increases toward the outer side. A in the above general formula (1) is represented by a structure of the following formula:

and $R^1$ represents an aromatic group that may have a substituent, p represents the number of bonds to $R^1$.

B in the above general formula (1) is represented by a structure of the following formula:

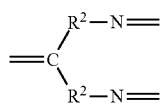

in which one azomethine bond is formed for the A, and $R^2$ represents an aromatic group that may have the same or different substituent. B constitutes the generation of the phenyl azomethine dendrimer molecule, and B which is directly bound to the core molecular group A becomes a first generation.

R in the above general formula (1) is represented by a structure of the following formula:

in which an azomethine bond is formed to B as a terminal group, and $R^3$ represents an aromatic group that may have the same or different substituent. R is positioned at a terminal of a structure in which the phenyl azomethine dendrimer molecule is radially grown, and constitutes a generation similarly to B described above.

In the above general formula (1), n represents the generation number through a structure of B of the phenyl azomethine dendrimer, m represents the number of terminal groups R of the phenyl azomethine dendrimer, m=p when n=0, and $m=2^n p$ when n≥1.

Each of $R^1$, $R^2$ and $R^3$, which are an aromatic group that may have a substituent, may be independently a phenyl group or a similar structure thereof as a backbone structure, and examples thereof include various groups, such as a phenyl group, a biphenyl group, a biphenyl alkylene group, a biphenyl oxy group, a biphenyl carbonyl group, a phenyl alkyl group and the like. In these backbones, as a substituent, a halogen atom such as a chlorine atom, a bromine atom, a fluorine atom and the like, an alkyl group such as a methyl group, an ethyl group and the like, a haloalkyl group such as a chloromethyl group, a trifluoromethyl group and the like, an alkoxy group such as a methoxy group, an ethoxy group and the like, an alkoxyalkyl group such as a methoxyethyl group and the like, various substituents, such as an alkylthio group, a carbonyl group, a cyano group, an amino group, a nitro group and the like are exemplified. The backbone may have any one or a plurality of these substituents.

Among the substituents, a substituent having high electron donating property, such as a methoxy group and an amino group, or a substituent having high electron accepting property, such as a cyano group and a carbonyl group, is preferred.

In the core portion represented by the formula $R^1(-N=)_p$, p is not particularly limited, but may be, for example, an integer of from 1 to 4. Furthermore, the n in the above general formula (1) is an integer of 0 or 1 or more, but for example, 2 to 6 is preferably exemplified.

One form of the phenyl azomethine dendrimer compound may be a compound represented by the following formula. The compound represented by the following formula is a phenyl azomethine dendrimer compound having a generation number of 4.

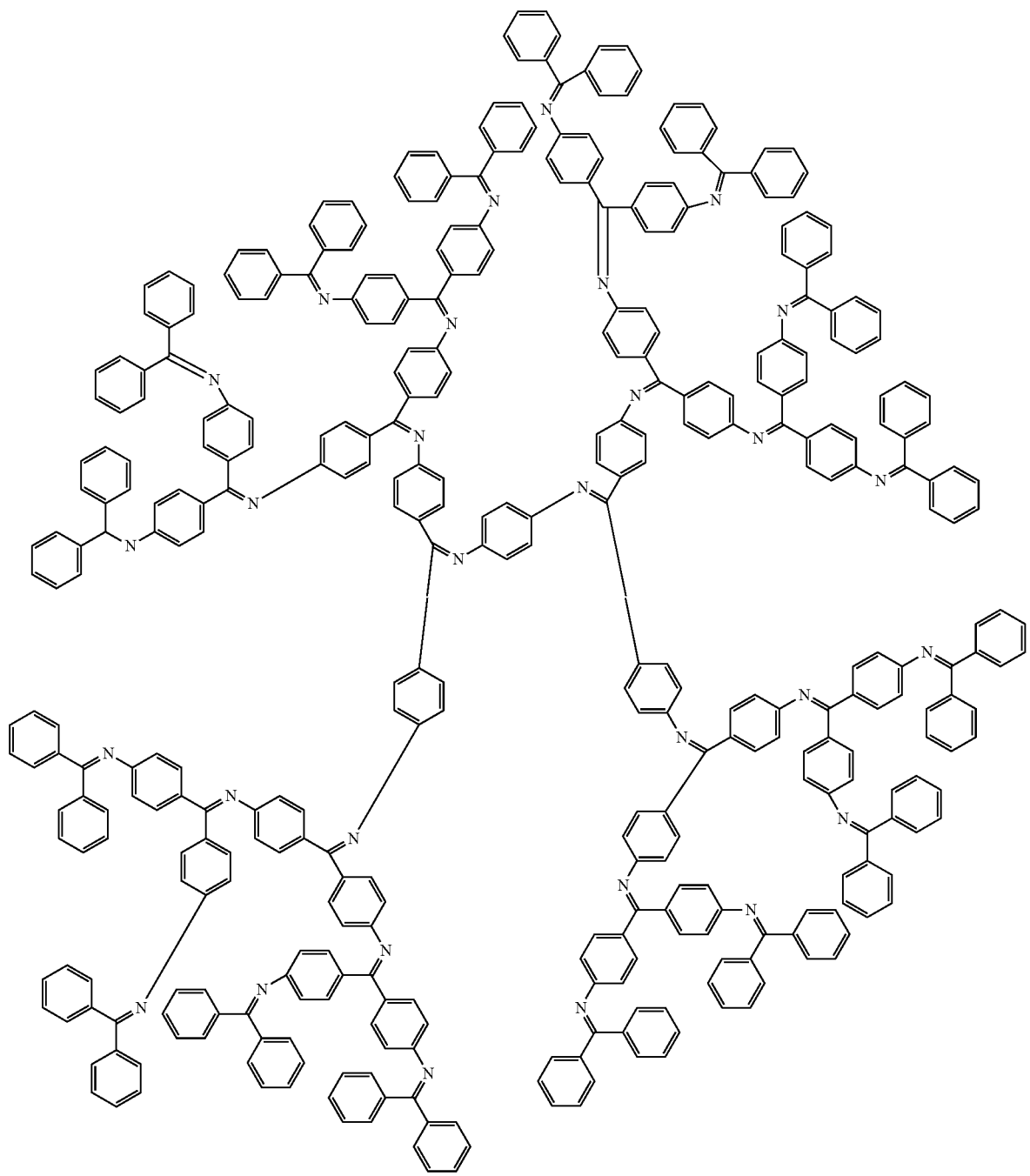

The phenyl azomethine dendrimer compound represented by the above formula (1) is a comparatively large molecule as a single molecule compound (for example, a phenyl azomethine dendrimer compound of the 4th generation (n=3) having a diameter of about 2 nm), and possess a plurality of nitrogen atoms capable of coordinating with a metal atom within the molecule at a certain interval. Therefore, the phenyl azomethine dendrimer compound enables each atom of a plurality of metal elements to be regularly disposed one by one as a single molecule compound, within the molecule having a comparatively large size. Thus disposed a plurality of metal atoms consequently have an atomic valency of 0 by, for example, subjecting to a reduction treatment, thereby leading to formation of metal nanoparticles through binding with one another within the phenyl azomethine dendrimer.

In addition, since the phenyl azomethine dendrimer compound is constituted with an aromatic ring and an azomethine bond in the backbone thereof, it forms a rigid spherical molecule. Thus, according to the phenyl azomethine dendrimer compound, the spaces in the molecules can be maintained favorably when the particles of the phenyl azomethine dendrimer compound are formed from the solution, whereby metal nanoparticles can be preferably retained inside thereof.

In order to synthesize the phenyl azomethine dendrimer, known methods may be used. Examples of these methods include a method of reacting benzophenone with diaminobenzophenone in a chlorobenzene solvent in the presence of titanium chloride and a base and sequentially reacting the resulting solution with diaminobenzophenone to increase the generation number, but are not limited thereto.

The phenyl azomethine dendrimer compound in the present invention may be either coordinated or not coordinated with a metal atom inside thereof. When the phenyl azomethine dendrimer compound is coordinated with a metal atom, illustrative examples of the metal atom include iron, ruthenium, cobalt, rhodium, palladium, platinum, gallium, vanadium, gold, copper, and the like. These metal atoms may be used either alone or in combination of two or more thereof taking into consideration characteristic features such as catalytic activities required. The "phenyl azomethine dendrimer compound" as referred to herein includes both those having metal atoms coordinated therein, and those not having metal atoms coordinated therein.

The solvent for dissolving the phenyl azomethine dendrimer compound may be exemplified by chlorine-containing organic solvents such as dichloromethane, chloroform, 1,2-dichloroethane, 1,1-dichloroethane and carbon tetrachloride, aromatic organic solvents such as benzene, toluene, xylene, chlorobenze and anisole, and organic solvents such as cyclohexanone, tetrahydrofuran, limonene and propylene glycol monoethyl ether acetate. Among them, the chlorine-containing organic solvent or the aromatic organic solvent is preferably used, and dichloromethane and chloroform are more preferably used. The uniformity of the solution of the phenyl azomethine dendrimer compound is improved by selecting these as a solvent, and highly dispersed particles of the phenyl azomethine dendrimer compound can be disposed on the surface of a substrate in a volatilization step described later.

Furthermore, the solvent for dissolving the phenyl azomethine dendrimer compound has a vapor pressure at 25° C. of preferably no less than 180 mmHg, and more preferably no less than 250 mmHg. By using the solvent having the vapor pressure described above, it is possible to make a volatilization rate of the solvent appropriate in the volatilization step described later, and highly dispersed particles of the phenyl azomethine dendrimer compound can be disposed on the surface of a substrate.

The phenyl azomethine dendrimer compound is dissolved in the solvent to prepare a solution. In this procedure, the means for dissolving the phenyl azomethine dendrimer compound in the solvent is not particularly limited, and conventionally well-known means may be used without a limitation in particular.

It is necessary that the concentration of the phenyl azomethine dendrimer compound contained in the solution is no greater than 5 µmol/L. When the concentration of the phenyl azomethine dendrimer compound contained in the solution is no greater than 5 µmol/L, it is possible to inhibit in the volatilization step described later: excessive aggregation of the phenyl azomethine dendrimer compound molecules with one another to form large particles on the surface of a substrate; or formation of a film of the phenyl azomethine dendrimer compound on the surface of the substrate, whereby highly dispersed particles of the phenyl azomethine dendrimer compound can be disposed on the surface of the substrate.

In addition, the lower limit of the concentration of the phenyl azomethine dendrimer compound contained in the solution is preferably 0.001 µmol/L, more preferably 0.01 µmol, and most preferably 0.05 µmol. When the concentration of the phenyl azomethine dendrimer compound contained in the solution is no less than 0.001 µmol/L, the particles of the phenyl azomethine dendrimer compound can be certainly provided on the surface of the substrate, and thus imparting a desired characteristic feature is enabled.

The concentration of the phenyl azomethine dendrimer compound contained in the solution may be preferably 0.001 µmol/L to 5 µmol/L, and more preferably, the concentration of the phenyl azomethine dendrimer compound contained in the solution may be 0.01 µmol/L to 5 µmol/L. Still more preferably, the concentration of the phenyl azomethine dendrimer compound contained in the solution may be 0.05 µmol/L to 5 µmol/L.

The solution thus prepared is applied on the surface of a substrate. The substrate on which the solution is applied will have highly dispersed particles of the phenyl azomethine dendrimer compound disposed on the surface thereof, according to the volatilization described later. Such a substrate is not particularly limited, and illustrative examples include silicon substrates, glass substrates, metal substrates, plastic substrates and the like, and may be appropriately selected taking into consideration the intended use of the product obtained.

As the means for applying the prepared solution on the surface of the substrate, a well-known means may be appropriately selected. Examples of such a means include a brush painting method, a roll coater method, a gravure coater method, a spin coating method, an immersion method, a droplet casting method, and the like, but not particularly limited thereto. The film thickness of the solution after the application on the surface of the substrate may be 0.5 nm to 100 nm.

[Volatilization Step]

The substrate after completing the above application step is subjected to a volatilization step. According to the volatilization step, the solvent is volatilized from the surface of the substrate to which the solution was applied. When this step is carried out, the phenyl azomethine dendrimer compound contained in the solution is deposited on the surface of the substrate in the form of particles. According to the present invention, by using the aforementioned solution in particular, the particles can be deposited in a highly dispersed state on the surface of the substrate.

The means for volatilizing the solvent from solution applied on the surface of the substrate is not particularly limited. Illustrative examples of such a means include natural drying, drying under reduced pressure, drying by heating, vacuum drying by heating, and the like. Of these, natural drying is preferably exemplified.

As already stated, by subjecting to this step, highly dispersed particles of the phenyl azomethine dendrimer compound are deposed and disposed on the surface of the substrate. In this procedure, an average particle diameter in planar view of the dispersed particles as determined by observation with an AFM (atomic force microscope) may be less than 60 nm. It is to be noted that the "average particle diameter in planar view" means an average particle diameter of the dispersed particles when the substrate is viewed as a plane. In addition, the average height of the dispersed particles from the surface of the substrate as determined by observation with the AFM may be less than 5 nm. When the particles of the phenyl azomethine dendrimer compound have such an average height value, they are concluded to be present at a height approximately corresponding to one molecule, and thus they are considered to be highly dispersed.

<Substrate Having Dispersed Particles of a Dendrimer Compound on the Surface Thereof>

A substrate obtained by the production method of the present invention explained above is also included as an aspect of the present invention. With respect to the substrate, the explanation is omitted in this section since the same applied thereto.

EXAMPLES

Next, the present invention will be described in more detail by showing examples. However, the present invention is not limited to the following examples.

Synthesis of Phenyl Azomethine Dendrimer

Synthesis of 2nd Generation Phenyl Aazomethine Dendron Precursor (Pre-G2on)

Benzophenone (4.62 g, 25.3 mmol), 4,4'-diaminodiphenyl methane (2.5 g, 12.6 mmol) and 1,4-diazabicyclo[2.2.2]octane (DABCO) (8.49 g, 75.7 mmol) were weighed out, with which the septum of a 100 mL three-necked flask was charged and blocked, and the flask was purged with nitrogen. 50 mL of chlorobenzene was added thereto, the resulting mixture was stirred while being heated by an oil bath (125° C.), and the raw materials were dissolved. Titanium tetrachloride (2.01 mL, 1.84 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with a celite, the celite was washed with chlorobenzene, then the solvent was distilled off from the recovered filtrate and purified by silica gel column chromatography (as an eluent, a mixture, in which 2 mass % of triethylamine was added to a mixed solvent of chloroform:hexane:ethyl acetate=4:4:1, was used), and the solvent was distilled off to obtain a 2nd generation phenyl azomethine dendron precursor (Pre-G2on), which is a target material.

Synthesis of 2nd Generation Phenyl Azomethine Dendron (G2on)

Pre-G2on (2.17 g, 3.98 mmol), potassium permanganate (1.19 g, 7.5 mmol) and tetra-n-butylammonium bromide (2.42 g, 7.5 mmol) were weighed out and placed in an eggplant flask, and dichloroethane (25 mL) was added thereto and the resulting mixture was stirred while the container was dipped in a water bath. After 1 hour, the water bath was removed and reaction was performed for 2 days. After the reaction was completed, a saturated $NaHSO_3$ aqueous solution was further added thereto to inactivate the potassium permanganate, liquid separation was performed with a saturated saline solution to which 2 wt % of triethylamine was added, and tetra-n-butylammonium bromide was removed. After the liquid separation, the organic layer was dried by sodium sulfate, and then the solvent was distilled off. Thereafter, purification was performed by silica gel column chromatography (as an eluent, a mixture, in which 2 mass % of triethylamine was added to a mixed solvent of chloroform:hexane:ethyl acetate=4:4:1, was used), and the solvent was distilled off to obtain a 2nd generation phenyl azomethine dendron (G2on), which was a target material.

Synthesis of 3rd Generation Phenyl Azomethine Dendron Precursor (Pre-G3on)

G2on (5.161 g, 9.55 mmol), 4,4'-diaminodiphenyl methane (0.901 g, 4.54 mmol) and DABCO (8.49 g, 7.57 mmol) were weighed out, with which the septum of a 100 mL three-necked flask was charged and blocked, and the flask was purged with nitrogen. 50 mL of chlorobenzene was added thereto, the resulting mixture was stirred while being heated by an oil bath (125° C.), and the raw materials were dissolved. Titanium tetrachloride (2.01 mL, 1.84 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with celite, the celite was washed with chlorobenze, then the solvent was distilled off from the recovered filtrate and purified by silica gel column chromatography (as an eluent, a mixture, in which 2 mass % of triethylamine was added to a mixed solvent of chloroform:hexane:ethyl acetate=3:3:1, was used), and the solvent was distilled off to obtain a 3rd generation phenyl azomethine dendron precursor (Pre-G3on), which was a target material.

Synthesis of 3rd Generation Phenyl Azomethine Dendron (G3on)

Pre-G3on (1.27 g, 1.02 mmol), potassium permanganate (0.95 g, 6.0 mmol) and tetra-n-butylammonium bromide (1.95 g, 6.1 mmol) were weighed out and placed in an eggplant flask, and dichloroethane (25 mL) was added thereto and the resulting mixture was stirred while the container was dipped in a water bath. After 1 hour, the water bath was removed and reaction was performed for 3 days. After the reaction was completed, a saturated $NaHSO_3$ aqueous solution was further added thereto to inactivate the potassium permanganate, liquid separation was performed with a saturated saline solution to which 2 mass % of triethylamine was added, and tetra-n-butylammonium bromide was removed. After the liquid separation, the organic layer was dried by sodium sulfate, and then the solvent was distilled off. Thereafter, purification was performed by silica gel column chromatography (as an eluent, a mixture, in which 2 mass % of triethylamine was added to a mixed solvent of chloroform:hexane:ethyl acetate=3:3:1, was used), and the solvent was distilled off to obtain a 3rd generation phenyl azomethine dendron (G3on), which was a target material.

Synthesis of 4th Generation Phenyl Azomethine Dendron Precursor (Pre-G4on)

G3on (4.90 g, 3.9 mmol), 4,4'-diaminodiphenyl methane (0.387 g, 1.95 mmol) and DABCO (1.31 g, 11.7 mmol) were weighed out, with which the septum of a 100 mL three-necked flask was charged and blocked, and the flask was purged with nitrogen. 20 mL of chlorobenzene was added thereto, the resulting mixture was stirred while being heated by an oil bath (125° C.), and the raw materials were dissolved. Titanium tetrachloride (0.32 mL, 2.93 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with a celite, the celite was washed with chlorobenzene, then the solvent was distilled off from the recovered filtrate and purified by silica gel column chromatography (as an eluent, a mixture, in which 2 mass % of triethylamine was added to a mixed solvent of chloroform:hexane:ethyl acetate=2:2:1, was used), and the solvent was distilled off to obtain a 4th generation phenyl azomethine dendron precursor (Pre-G4on), which was a target material.

Synthesis of 4th Generation Phenyl Azomethine Dendron (G4on)

Pre-G4on (4.62 g, 3.67 mmol), potassium permanganate (3.33 g, 21 mmol) and tetra-n-butylammonium bromide (6.78 g, 21 mmol) were weighed out and placed in an eggplant flask, and dichloroethane (25 mL) was added thereto and the resulting mixture was stirred while the container was dipped in a water bath. After 1 hour, the water bath was removed and reaction was performed for 7 days. After the reaction was completed, a saturated $NaHSO_3$ aqueous solution was further added thereto to inactivate the potassium permanganate, liquid separation was performed with a saturated saline solution to which 2 mass % of triethylamine was added, and tetra-n-butylammonium bromide was removed. After the liquid separation, the organic layer was dried by sodium sulfate, and then the solvent was distilled off. Thereafter, purification was performed by silica gel column chromatography (as an eluent, a mixture, in which 2 mass % of triethylamine was added to a mixed solvent of chloroform:hexane:ethyl acetate=3:3:1, was used), then the solvent was distilled off, the solid obtained was prepared into a chloroform solution (10 mass %), then purification was performed by HPLC, and the solvent was distilled off. The solid obtained was prepared into a chloroform solution (10 mass %), re-precipitation was performed in the presence of 10-fold diluted ethanol, and the solid obtained was recovered by filtration under reduced pressure to obtain a 4th generation phenyl azomethine dendron (G4on), which was a target material.

Synthesis of 4th Generation Phenyl Azomethine Dendrimer (DPAG4er)

p-phenylenedianiline (10.2 mg), G4 on (500 mg) and DABCO (245.5 mg) were weighed out and placed in a reaction vessel, vacuum degassing was performed, then with which the septum of the vessel was charged and blocked, and the vessel was purged with nitrogen. 20 mL of chlorobenzene was added thereto, the resulting mixture was stirred while being heated by an oil bath (125° C.), and the raw materials were dissolved. Titanium tetrachloride (0.06 mL, 0.547 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with a celite, the celite was washed with chlorobenze, then the solvent was distilled off from the recovered filtrate and purified by silica gel column chromatography (as an eluent, a mixture, in which 2 mass % of triethylamine was added to a mixed solvent of chloroform:hexane:ethyl acetate=2:2:1, was used), the solvent was distilled off, the solid obtained was prepared into a chloroform solution (10 mass %), then purification was performed by HPLC, and the solvent was distilled off. The solid obtained was prepared into a chloroform solution (10 mass %), re-precipitation was performed in the presence of 10-fold diluted methanol, and the solid obtained was recovered by filtration under reduced pressure to obtain a 4th generation phenyl azomethine dendrimer (DPAG 4er), which was a target material. Using this 4th generation phenyl azomethine dendrimer, the following test was carried out.

Solutions of phenyl azomethine dendrimer (DPA 4er) were prepared with each solvent and at each concentration shown in Table 1. Each of these solution was applied on the surface of a mica substrate by a spin coating method (amount of dropwise addition: 1 mL; rotation frequency: 1,500 rpm), and the solvent included in the applied solution was naturally dried, whereby the particles of the phenyl azomethine dendrimer were able to be successfully dispersed over the surface of the substrate. The surface of the mica substrate thus obtained was observed with an AFM (atomic force microscope; manufactured by Seiko Instruments Inc., model SPA400), and thus the average particle diameter in planar view and the average value of the height from the substrate of the formed phenyl azomethine dendrimer particles were calculated. The results are shown in Table 1. It is to be noted that "average particle diameter in planar view" means an average particle diameter of the phenyl azomethine dendrimer particles when the mica substrate was viewed as a plane.

TABLE 1

| | Concentration of DPA 4er (μmol/L) | Solvent | Vapor pressure of solvent (mmHg, at 25° C.) | Average particle diameter in planar view (nm) | Average height (nm) |
|---|---|---|---|---|---|
| Example 1 | 0.08 | Dichloromethane | 450 | 9.66 | 1.80 |
| Example 2 | 0.25 | Dichloromethane | 450 | 18.9 | 3.16 |
| Example 3 | 0.65 | Dichloromethane | 450 | 27.2 | 3.14 |
| Example 4 | 1 | Chloroform | 194.8 | 32.0 | 2.53 |
| Example 5 | 5 | Dichloromethane | 450 | 53.4 | 3.15 |
| Example 6 | 0.25 | Tetrahydrofuran | 176 | 28.9 | 4.16 |
| Example 7 | 1 | Toluene | 29.3 | 51.7 | 3.20 |
| Comparative Example 1 | 10 | Chloroform | 194.8 | 82.0 | 5.26 |
| Comparative Example 2 | 25 | Chloroform | 194.8 | Film formation | Film formation |

As shown in Table 1, according to the production method of the present invention in which the concentration of the phenyl azomethine dendrimer in the solution is no greater than 5 μmol/L, the average particle diameter in planar view of the phenyl azomethine dendrimer particles formed on the surface of the substrate became less than 60 nm; therefore, it is revealed that highly dispersed particles can be formed on the surface of a substrate. Particularly, these particles had an average height of no greater than about 4 nm, and thus it is revealed that the particles were formed as an almost single molecule or several molecules along an altitude direction.

In addition, when Examples 2 and 6 are compared with Examples 4 and 7, it is construed that the average particle size becomes smaller as the vapor pressure of the solvent increases, in the case in which the concentrations of the phenyl azomethine dendrimer in the solution are the same. Referring to each Example in these regards, it is understood that the vapor pressure of the solvent at 25° C. of no less than about 180 mmHg is preferred since achievement of higher dispersion of the phenyl azomethine dendrimer particles is enabled.

What is claimed is:

1. A method for producing a substrate having dispersed particles of a dendrimer compound on the surface thereof, the method comprising: an application step including dissolving a phenyl azomethine dendrimer compound represented by the following general formula (1) in a solvent to prepare a solution, and applying the solution on the surface of a substrate; and a volatilization step including volatilizing the solvent from the solution applied on the surface of the substrate, the concentration of the phenyl azomethine dendrimer compound contained in the solution is no greater than 5 μmol/L:

$$AB_nR_m \qquad (1)$$

wherein A in the above general formula (1) is a core molecular group of the phenyl azomethine dendrimer and represented by a structure of the following formula:

wherein $R^1$ represents an aromatic group that may have a substituent, and p represents the number of bonds to the $R^1$; and B in the above general formula (1) is represented by a structure of the following formula:

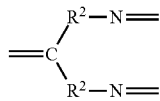

in which one azomethine bond is formed for the A, the $R^2$ represents an aromatic group that may have the same or different substituent;

the R in the above general formula (1) is represented by a structure of the following formula:

in which an azomethine bond is formed to the B as a terminal group, and the $R^3$ represents an aromatic group that may have the same or different substituent;

n represents a generation number through a structure of the B of the phenyl azomethine dendrimer; and m represents the number of terminal groups R of the phenyl azomethine dendrimer, and m is equal to p provided that n is 0, whereas m is equal to 2"p provided that n is no less than 1.

2. The method for producing a substrate having dispersed particles of a dendrimer compound on the surface thereof according to claim 1, wherein the solvent is an aromatic or chlorine-containing solvent.

3. The method for producing a substrate having dispersed particles of a dendrimer compound on the surface thereof according to claim 1, wherein the solvent has a vapor pressure at 25° C. of no less than 180 mmHg.

4. The method for producing a substrate having dispersed particles of a dendrimer compound on the surface thereof according to claim 1, wherein the dispersed particles have an average particle diameter in planar view of less than 60 nm as determined by observation with an AFM (atomic force microscope), and the dispersed particles have an average height from the surface of the substrate of less than 5 nm.

* * * * *